United States Patent
Lele et al.

(10) Patent No.: US 8,432,951 B2
(45) Date of Patent: Apr. 30, 2013

(54) METHODS FOR TRANSMITTING AND RECEIVING A MULTICARRIER SPREAD-SPECTRUM SIGNAL, CORRESPONDING SIGNAL, COMPUTER PROGRAM PRODUCTS AND TRANSMISSION AND RECEPTION DEVICES

(75) Inventors: Chrislin Lele, Saint Jacques (FR); Pierre Siohan, Rennes (FR); Rodolphe Legouable, Cesson-Sevigne (FR); Maurice Bellanger, Paris (FR)

(73) Assignee: France Telecom, Paris (FR)

( * ) Notice: Subject to any disclaimer, the term of this patent is extended or adjusted under 35 U.S.C. 154(b) by 666 days.

(21) Appl. No.: 12/599,762

(22) PCT Filed: Apr. 18, 2008

(86) PCT No.: PCT/FR2008/050705
§ 371 (c)(1),
(2), (4) Date: Jan. 22, 2010

(87) PCT Pub. No.: WO2008/145917
PCT Pub. Date: Dec. 4, 2008

(65) Prior Publication Data
US 2010/0238978 A1    Sep. 23, 2010

(30) Foreign Application Priority Data

May 11, 2007 (FR) .................................. 07 03421

(51) Int. Cl.
*H04B 1/69*     (2011.01)
*H04B 7/216*    (2006.01)

(52) U.S. Cl.
USPC ........... 375/141; 375/146; 375/148; 370/342; 370/441

(58) Field of Classification Search .................. 375/260, 375/295, 298, 299, 316, 340, 347, 130, 140, 375/141, 146, 142, 144, 147, 148, 150; 370/203, 370/206, 208, 210, 335, 342, 441
See application file for complete search history.

(56) References Cited

U.S. PATENT DOCUMENTS

| | | | | |
|---|---|---|---|---|
| 5,377,183 | A | * | 12/1994 | Dent ............................. 370/335 |
| 6,031,827 | A | * | 2/2000 | Rikkinen et al. .............. 370/335 |
| 7,436,881 | B2 | * | 10/2008 | Nedic et al. ................... 375/233 |

(Continued)

FOREIGN PATENT DOCUMENTS

| | | |
|---|---|---|
| EP | 0903871 A2 | 3/1999 |
| EP | 1511206 A1 | 3/2005 |
| WO | 2006130742 A1 | 12/2006 |

OTHER PUBLICATIONS

Lele et al., "CDMA Transmission with Complex OFDM/OQAM," Hindawi publishing, pp. 1-12, 2010.*

(Continued)

*Primary Examiner* — Tesfaldet Bocure
(74) *Attorney, Agent, or Firm* — David D. Brush; Westman, Champlin & Kelly, P.A.

(57) ABSTRACT

A method and apparatus are provided for transmitting a multicarrier spread-spectrum signal formed by a temporal succession of multicarrier symbols, using OQAM modulation and a plurality of inter-orthogonal spreading codes. The method includes spreading at least one complex-value data symbol, representative of a source data signal to be transmitted, over a set of sub-carriers of at least one multicarrier symbol, each of the sub-carriers modulating a complex value.

14 Claims, 4 Drawing Sheets

U.S. PATENT DOCUMENTS

| | | | |
|---|---|---|---|
| 7,609,611 B1* | 10/2009 | Siohan et al. | 370/208 |
| 2003/0169824 A1* | 9/2003 | Chayat | 375/260 |
| 2004/0131110 A1* | 7/2004 | Alard et al. | 375/149 |
| 2004/0252775 A1* | 12/2004 | Park | 375/260 |

OTHER PUBLICATIONS

Zobra et al., "Spatial Diversity Scheme to Efficiently Cancel ISI and ICI OFDM-OQAM," Hindawi publishing, pp. 1-10, 2010.*

Lele et al., "The Alamouti Scheme with CDMA-OFDM/OQAM," Hindawi publishing, pp. 1-13, 2010.*

Chen, Hsiao et al.: "Optimization of Transmitter and Receiver Filters for OQAM-OFDM Systems Using Nonlinear Programming", IEICE Transactions on Communications, No. 11, Nov. 11, 1997.

Klein, Anja et al.: "Frames Multiple Access Mode 1-Wideband TDMA With and Without Spreading", IEE International Symposium on Personal, Indoor and Mobile Radio Communications, vol. 1, Sep. 1, 1997.

French Search Report of Counterpart Application No. 0703421, Filed on May 11, 2007.

International Search Report of Counterpart Application No. PCT/FR2008/050705, Filed on Apr. 18, 2008.

English Translation of the International Preliminary Report on Patentability of Counterpart Application No. PCT/FR2008/050705, Filed on Apr. 18, 2008.

* cited by examiner

METHODS FOR TRANSMITTING AND RECEIVING A MULTICARRIER SPREAD-SPECTRUM SIGNAL, CORRESPONDING SIGNAL, COMPUTER PROGRAM PRODUCTS AND TRANSMISSION AND RECEPTION DEVICES

CROSS-REFERENCE TO RELATED APPLICATIONS

This Application is a Section 371 National Stage Application of International Application No. PCT/FR2008/050705, filed Apr. 18, 2008 and published as WO 2008/145917 on Dec. 4, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the transmission and broadcasting of digital information, especially at high bit rates, on a limited frequency bandwidth.

More specifically, the disclosure relates to a technique for transmitting and receiving a multicarrier, spread-spectrum signal using complex-value data symbols in a mobile or fixed context.

In particular, the technique of the disclosure is well-suited to the transmission of multicarrier signals that have undergone OFDM/OQAM (orthogonal frequency division multiplexing/offset quadrature amplitude modulation) type modulation or BFDM/OQAM (bi-orthogonal frequency division multiplexing/offset quadrature amplitude modulation) type modulation, for which the carriers are shaped by a prototype function.

BACKGROUND OF THE DISCLOSURE

1. Multicarrier Modulations
1.1 OFDM Modulations

To date, there are known OFDM (orthogonal frequency division multiplex) type multicarrier modulations. Such a modulation technique provides an efficient solution to the broadcasting of information, especially for radio or wired type multiple-path channels.

The OFDM multicarrier modulation technique has therefore been chosen in several standards and specifications for wire transmission applications, for example of the ADSL (asymmetric digital subscriber line) and PLC (power line communication) type or wireless applications for example of the DAB (digital audio broadcasting), DVB-T (digital video broadcasting-terrestrial) and WLAN (wireless local area network) types.

However, the rectangular shaping of a signal as performed by an OFDM modulator has the drawback of poor frequency location.

Consequently, alternative solutions have been proposed, leading to multicarrier modulation systems in which the signal is shaped by functions known as prototype functions which give better frequency location.

It may be recalled that the set of sub-carriers of a multicarrier modulation forms a multiplex and that each of the sub-carriers of this multiplex can be shaped by means of a same prototype function denoted g(t) which characterizes the multicarrier modulation.

1.2 OFDM/OQAM Modulations

Thus, one proposed solution entails replacing a QAM (quadrature amplitude modulation) implemented by each of the sub-carriers by a modulation which offsets the real and imaginary paths of the complex data to be transmitted, for two successive carrier frequencies, by a half symbol period.

This alternation leads to an OFDM/OQAM type multicarrier modulation. This approach makes it possible especially to achieve requisite conditions of orthogonality with prototype filters which are not necessarily rectangular. Indeed, the temporal offset introduced by the OQAM modulation loosens the constraints of orthogonality or more generally the conditions of bi-orthogonality. This class of modulation thus provides a wider choice of prototype functions than that given by the simple rectangular prototype function of an OFDM modulation.

Thus, depending on the type of transmission channel considered for a given application, such as for example the radio-mobile channel or the power line carrier (PLC) channel, it is possible to make a choice of prototype functions suited to the type of specifications and/or distortions encountered. In particular, it is preferable to choose prototype functions having better frequency selectivity than the cardinal sine function used in OFDM modulation, especially in radiomobile channels, to combat the frequency dispersion due to the Doppler effect or again in PLC applications to better withstand narrow-band scramblers and, generally speaking, to meet the frequency specifications of the transmission masks more easily.

More specifically, the OQAM signal can be represented in baseband in the following form:

$$s(t) = \sum_n \sum_{m=0}^{M-1} a_{m,n} \underbrace{g(t-n\tau_0)e^{j2\pi m\nu_0 t}e^{j\phi_{m,n}}}_{g_{m,n}(t)} \quad (1)$$

with:
- $a_{m,n}$ the real-value data symbols to be transmitted on a sub-carrier m at the instant n;
- M the number of carrier frequencies (necessarily an even-parity value);
- g the prototype function used by the modulator;
- $\tau_0$ the duration of a multicarrier symbol;
- $\nu_0$ the spacing between two adjacent sub-carriers of the multiplex;
- $\phi_{m,n}$ a phase term chosen so as to achieve a real-part/imaginary-part alternation enabling orthogonality or more generally bi-orthogonality.

The OFDM/OQAM modulation is therefore an alternative to the classic OFDM modulation relying on a judicious choice of the prototype function modulating each of the sub-carriers of the signal which must be properly located in the time/frequency space.

It may be recalled that the OFDM type modulations classically transmit complex-value data symbols while the OFDM/OQAM type modulations transmit real-value data symbols, an OFDM/QAM complex-value data symbol or an OFDM/OQAM real-value data symbol being constituted by a set of data elements at a given instant t.

The spectral efficiency of the OFDM/OQAM is therefore identical to that of classic OFDM without any guard interval. Indeed, for a same inter-carrier spacing $v_0$, there is transmitted:

in OFDM/OQAM modulation, one real value per sub-carrier every time slot $\tau_0$;

in classic OFDM modulation without guard interval, one complex value (i.e. two real values) every $2\times\tau_0$.

If we consider an OFDM type modulation with a guard interval, where a symbol with a duration $2\tau_0$ is extended by a guard interval with a duration $\Delta$, the spectral efficiency of OFDM/OQAM is $(\Delta+2\tau_0)/2\tau_0$ times greater than that of the OFDM type modulation.

It may also be recalled that the OFDM/OQAM type modulation techniques do not require the introduction of a guard interval or a cyclic prefix while at the same time presenting the same spectral efficiency as classic OFDM modulations.

1.3 BFDM/OQAM Modulation

In addition, if it is chosen to have demodulation functions on the reception side that are not necessarily the functions conjugate to the prototype functions used in transmission, then it is possible, in using the property of bi-orthogonality, to extend the use of OFDM/OQAM to the technique of BFDM/OQAM modulation. Indeed, the offset principle related to the OQAM family is strictly identical in BFDM/OQAM type modulation.

More specifically, the usefulness of the BFDM/OQAM type modulation is that, for a given length of prototype filter, it reduces the delay given by the transmission system.

As indicated here above, the BFDM/OQAM type modulation technique, just like the OFDM/OQAM modulation technique, transmits real-value data symbols at a rate twice that at which the OFDM type modulation transmits complex-value data symbols. Consequently, these two modulations have the same spectral efficiency in principle.

Indeed, in the bi-orthogonal case, the demodulation base at reception can be different from that at transmission and can be expressed in the following form:

$$f_{m,n}(t) = f(t-n\tau_0)e^{j2\pi m v_0 t}e^{j\phi_{m,n}} \quad (2)$$

The condition of bi-orthogonality can then be expressed in the following form:

$$\langle g_{m,n}, f_{m',n'} \rangle_R = \Re\left\{\int_{-\infty}^{\infty} g_{m,n}(t) f^*_{m',n'}(t)\,dt\right\} = \delta_{m,m'}\delta_{n,n'} \quad (3)$$

where: $\langle .,. \rangle_R$ designates the real scalar product and $\Re\{.\}$ designates the real part.

Here below, we use the acronym OQAM to designate both OFDM/OQAM techniques and BFDM/OQAM type techniques.

1.4 MC-CDMA Modulations

In applications where spectral resources have to be shared between several users, also called subscribing users, within a transmission band, the OFDM modulation known as the classic modulation (with guard interval and achieved by simple fast Fourier transform) can be associated with a CDMA (code division multiple access) type multiple access technique.

This technique, also called MC-CDMA, has been extensively studied in the radiomobile context and is also envisaged for PLC applications.

More specifically, it enables a set of users to make simultaneous transmission in a same frequency band.

CDMA type multiple access is considered in various systems because of its flexibility in terms of access and its performance obtained in cell networks using a unit frequency re-utilization factor. Such a technique provides flexibility to the new systems of mobile and cell communications which must be capable of providing both fast transfer of data for a reduced number of users as well as a less rapid but robust transfer for data for a very large number of users in uplink and downlink modes.

The MC-CDMA technique is chiefly studied in the communications downlink (synchronous links) and enables different users to occupy the same time-frequency space by distinguishing each user with a spreading code which is the user's own code.

The codes associated with each user, also called spread-spectrum codes, are orthogonal and are for example derived from a Walsh-Hadamard type matrix.

For the downlink, each mobile terminal of the communications system processes only one transmission channel restoring the orthogonality of the codes in reception by a simple equalization of the signal of the "zero forcing" (ZF) or minimum mean squared error (MMSE) type.

However, on the uplink, the propagation of the data stream coming from the various users through the different propagation channels prompts a great loss of orthogonality of the spread-spectrum codes which cannot be totally restored, thus giving rise to high multiple-access interference (MAI). MAI then leads to mediocre performance in transmission if an equalization identical to that of the downlink is achieved. On the uplink, the MC-CDMA technique therefore makes it necessary to implement detectors of greater complexity.

MC-CDMA modulation achieves a spread-spectrum of the stream of data on different sub-carriers. The spread-spectrum sequence is thus applied in the frequency domain, thus allowing to benefit from the frequency diversity of the channel.

In addition, the advantage of applying a spread-spectrum in the frequency domain is that it is possible in reception to retrieve all the dissipated energy of the signal and use it to render the transmitted signal in the most efficient way possible.

More specifically, referring to FIG. 1, we present the generally structure of a MC-CDMA transmission system for a user j.

After a series/parallel conversion (not shown in the figure), each complex-value data symbol $d_{n,u,0}^{(c)}$, $d_{n,u,1}^{(c)}$, ..., $d_{n,u,N_0-1}^{(c)}$ undergoes $N_c$ replicas where $d_{n,j,m}^{(c)}$ represents the $m^{th}$ complex-value data symbol of the $j^{th}$ user at the instant n, and $N_c$ is the length of the spreading codes. Thus, the same data symbol is transmitted on $N_c$ different sub-carriers.

Let us consider for example the data symbol $d_{n,u,0}^{(c)}$: each replica $\mathbf{11}_1, \mathbf{11}_2, \ldots, \mathbf{11}_{Nc}$ of the data symbol has a spread chip proper to each user applied to it.

For example, the chip $c_{0,u}$ of the spreading code associated with the user u is applied to the first replica $\mathbf{11}_1$ of the data symbol $d_{n,u,0}^{(c)}$, the chip $c_{1,u}$ is applied to the second replica $\mathbf{11}_2$ of the data symbol $d_{n,u,0}^{(c)}$, and the chip $c_{N_c-1,u}$ is applied to the last replica $\mathbf{11}_{Nc}$ of the data symbol $d_{n,u,0}^{(c)}$.

It can be noted especially that, should the number of modulated sub-carriers $N_{pm}$ be equal to the size of the code $N_c$, the series/parallel conversion is not done.

The symbols coming from the spreading operation then undergo a classic OFDM type multicarrier modulation 12 (reverse Fourier transform followed by an insertion of a guard interval).

It is then deemed to be the case that each sub-carrier of the MC-CDMA signal conveys a part of the symbol corresponding to a chip of the spreading code, thus introducing frequency diversity.

The MC-CDMA technique therefore has two fields of orthogonality: that of the frequencies for the data of a same user and that of the spreading codes between users.

One of the main uses of this technique lies in the flexibility of allocating spectral resources and hence of the bit rate of information transmitted. Indeed, if a user needs to transmit at an information bit rate greater than a basic bit rate (it may be recalled that a spreading code has a corresponding given bit rate), the network will, as far as possible, assign it different spreading codes sequences, of course to the detriment of a reduction in the number of simultaneous users.

Should the U users each use a single code to transmit their data, the expression of the signal sent is:

$$s(t) = \sum_n \sum_{m=0}^{N_0-1} \sum_{p=0}^{N_o-1} \sum_{j=0}^{U-1} d_{n,j,m}^{(c)} c_{p,j} e^{2i\pi F_{mN_o+p} t} g(t-nT_s) \quad (4)$$

with:

$$F_{mN_o+p} = F_0 + \frac{mN_o + p}{2\tau_0};$$

$T_s = 2\tau_0 + \Delta$;
$N_0$ being the number of pieces of data transmitted in a multicarrier symbol per user such that $$N_0 = \frac{\text{number of modulated carriers}}{N_c};$$

U being the number of simultaneous users;

$$c_{p,j} = \pm \frac{1}{\sqrt{N_c}} \text{ the } p^{th}$$

power-standardized chip of the spreading code of the user j;
the spacing between sub-carriers is equal to $$\frac{1}{2\tau_0}$$

if $2\tau_0$ is the useful duration of a multicarrier symbol.

The MC-CDMA signal is then conveyed in the propagation channel 13 and demodulated and equalized in the block 14 (OFDM demodulation and equalization with elimination of the guard interval).

De-spreading corresponding to an operation which is appreciably the reverse of spreading is then implemented, delivering an estimation of complex data symbols.

This MC-CDMA transmission technique however has drawbacks linked to the use of an OFDM type multicarrier modulation.

Indeed, as already indicated, the OFDM modulation implies a loss of spectral efficiency due to the insertion of a guard interval.

Moreover, the gate function used in OFDM (for the rectangular shaping of the signal) is not properly located in frequency, thus making it sensitive to all the frequency drifts and entailing penalties with respect to transmission masks.

Besides, it must be noted that this transmission technique calls for the use of all the codes of a matrix of spreading codes (i.e. a full matrix of spreading codes) to attain the maximum bit rate of the system. We therefore use all the codes associated with this spreading matrix to attain the maximum capacity of the system.

1.5 OQAM-CDMA Real-Value Modulations

The use of an OQAM type modulation makes it possible especially to overcome the need for using a guard interval.

Thus, it has also been proposed to combine CDMA type multiple access techniques with OQAM modulation in which the data symbols transmitted are real-value symbols.

However, this transmission technique also calls for the use of a full matrix of spreading codes to attain the maximum bit rate of the system.

SUMMARY

An aspect of the disclosure relates to a method for transmitting a multicarrier spread-spectrum signal formed by a temporal succession of multicarrier symbols, implementing an OQAM type modulation and a plurality of mutually orthogonal spreading codes.

According to an embodiment of the invention, such a method comprises a step for spreading at least one complex-value data symbol, representing a source data signal to be transmitted, over a set of sub-carriers of at least one multicarrier symbol, each of said sub-carriers modulating a complex value.

Thus, an embodiment of the invention relies on a novel and inventive approach to the transmission of complex-value data symbols in a system combining OQAM type multicarrier modulations and multiple-access techniques implementing a spreading of the data. More specifically, an embodiment of the invention can be used to transmit a complex value on one and the same sub-carrier.

An embodiment of the invention therefore proposes a solution for transmitting complex data in OQAM/CDMA modulation.

It may be recalled indeed that the prior-art techniques of OQAM modulation made it necessary for the data symbols transmitted in an OFDM/OQAM signal to be of real value in order to ensure orthogonality between the sub-carriers in the real domain while an embodiment of the invention makes it possible to transmit complex-value data symbols in OFDM/OQAM modulation.

It can also be noted that the term "OQAM type multicarrier modulation" herein and further below in the document is understood to mean a BFDM/OQAM or OFDM/OQAM type multicarrier modulation.

An embodiment of the invention also improves transmission performance as compared with classic MC-CDMA (also known as OFDM/CDMA) type techniques through the use of an OQAM type modulation. Indeed, the use of a modulation of this type removes the need to use a guard interval, thus increasing the spectral efficiency of the proposed solution. In addition, the waveform associated with this modulation can be computed for a channel and for given transmission masks.

The association of OQAM/CDMA type techniques according to an embodiment of the invention therefore has advantages in terms of flexibility and bit rate performance as compared with the prior art techniques.

According to one particular characteristic of an embodiment of the invention, the transmission method comprises a step for obtaining at least one subset of spreading codes from a set of available spreading codes and said spreading step implements a multiplication of a complex-value data symbol by a spreading code derived from said subset.

An embodiment of the invention thus makes it possible to attain the maximum bit rate of transmission of a transmission system without using all the available spreading codes where the number of available codes depends on the sizing of a communications network in which an embodiment of the invention is implemented.

Consequently, according to an embodiment of the invention, the interferences related to spreading codes are reduced while only half of the available codes are used for example. In other words, it is possible to transmit complex data by using only half as many spreading codes as are used by the MC-CDMA type or OQAM/CDMA type real-value techniques for an identical bit rate sought, without causing great loss in orthogonality between the spreading codes, thus bringing about a reduction of multiple access interference (MAI).

In particular, said subset of spreading codes is determined in taking account of a number of transmission streams in a communications network in which an embodiment of the invention is implemented The number of transmission streams corresponds for example to the number of users in the network if each user uses only one spreading code. It may be recalled that it is also possible for a user to use several codes. Similarly, the spreading codes can be associated with distinct services available in the network.

According to one particular aspect of an embodiment of the invention, said set of available spreading codes is defined by the columns of a spreading matrix sized $M=2^{n_0}$, with $n_0$ being a positive integer, and the step for obtaining delivers two subsets of spreading codes, each comprising M/2 codes.

For example, the spreading matrix is a Walsh-Hadamard type matrix and the two subsets are determined recursively.

The spreading codes are therefore derived from a Walsh-Hadamard type matrix or a matrix derived from Walsh-Hadamard matrices defining for example the Golay codes.

According to one particular embodiment of the invention, the two subsets $S_1^{n_0}$ and $S_2^{n_0}$ are determined as follows:

for a spreading matrix sized $M=2^{n_0}=2^1$, the first subset $S_1^1$ comprises the spreading code corresponding to the first column of said spreading matrix, and the second subset $S_2^1$ comprises the spreading code corresponding to the second column of said spreading matrix;

for a spreading matrix sized $M=2^{n_0+1}$, the first subset $S_1^{n_0+1}$ comprises the spreading codes corresponding to the columns of said spreading matrix defined by the indices j such that $j=\{S_1^{n_0} \cup \overline{S}_1^{n_0}\}$, and the second subset $S_2^{n_0+1}$ comprises the spreading code corresponding to the columns of said spreading matrix defined by the indices j such that $j=\{S_2^{n_0} \cup \overline{S}_2^{n_0}\}$, for $1 \leq j \leq 2^{n_0+1}$, where:

in letting $i_{1,\alpha}$, for $1 \leq \alpha \leq 2^{n_0-1}$, denote the indices of the codes of the subset $S_1^{n_0}$ and letting $i_{2,\beta}$, for $1 \leq \beta \leq 2^{n_0-1}$, denote the indices of the codes of the subset $S_2^{n_0}$ such that $$S_1^{n_0} = \{i_{1,1}, i_{1,2}, i_{1,3}, \ldots, i_{1,2^{n_0}-1}\} \text{ and } S_2^{n_0} = \{i_{2,1}, i_{2,2}, i_{2,3}, \ldots, i_{2,2^{n_0}-1}\},$$

we have $$\overline{S}_1^{n_0} = \{i_{2,1} + 2^{n_0}, i_{2,2} + 2^{n_0}, i_{2,3} + 2^{n_0}, \ldots, i_{2,2^{n_0}-1} + 2^{n_0}\}$$

$$\overline{S}_2^{n_0} = \{i_{1,1} + 2^{n_0}, i_{1,2} + 2^{n_0}, i_{1,3} + 2^{n_0}, \ldots, i_{1,2^{n_0}-1} + 2^{n_0}\}.$$

According to one particular characteristic of an embodiment of the invention, the spreading step uses all the spreading codes of one of said subsets plus at least one spreading code of another subset.

An embodiment of the invention also increases the transmission bit rate relative to the maximum bit rate proposed by the prior art systems, i.e. an increase in the capacity of the system, in using more than half of the available spreading codes.

According to one particular aspect of an embodiment of the invention, the method for transmitting comprises an Alamouti type space-time encoding step and is implemented in a multiple-antenna system comprising at least two transmit antennas and at least one receive antenna.

Indeed, since the proposed solution makes it possible to work with complex data, it is possible to use an Alamouti type MIMO (multiple-input-multiple-output) or MISO (multiple-input-single-output) type encoding scheme in transmission.

Another aspect of an embodiment of the invention also pertains to a computer program product downloadable from a communications network and/or recorded on a computer-readable carrier and/or executable by a processor comprising program code instructions for implementing the method for transmitting described here above.

In another embodiment, the invention pertains to a device for transmitting a multicarrier spread-spectrum signal formed by a temporal succession of multicarrier symbols, implementing an OQAM type modulation and a plurality of mutually orthogonal spreading codes, comprising means for spreading at least one complex-value data symbol, representing a source data signal to be transmitted, over a set of sub-carriers of at least one multicarrier symbol, each of said sub-carriers modulating a complex value.

Such a device for transmitting is suited especially to implementing the above described method for transmitting. The device may for example be a base station or a radiotelephone type terminal, laptop or PDA type personal digital assistant.

An embodiment of the invention also pertains to a multicarrier spread-spectrum signal formed by a temporal succession of multicarrier symbols, implementing an OQAM type modulation and a plurality of mutually orthogonal spreading codes, in which at least one complex-value data symbol, representing a source data signal to be transmitted, is spread on a set of sub-carriers of at least one multicarrier symbol, each of said sub-carriers modulating a complex value.

Such a signal may particularly be transmitted according to the method for transmitting described here above. This signal could of course comprise different characteristics pertaining to the method for transmitting of an embodiment of the invention.

Another aspect of the invention relates to a method for receiving a multicarrier spread-spectrum signal formed by a temporal sequence of multicarrier symbols implementing an OQAM type modulation and a plurality of mutually orthogonal spreading codes.

The multicarrier spread-spectrum signal having undergone, at transmission, a step for spreading at least one complex-value data symbol, representing a source data signal to be transmitted, on a set of sub-carriers of at least one multicarrier symbol, each of said sub-carriers modulating a complex value, such a method for receiving comprises a step for de-spreading the multicarrier symbols, corresponding to a step that is the reverse of the spreading step, delivering at least one estimated complex value data symbol, representing a source data signal.

An embodiment of the invention thus proposes a solution for estimating complex data transmitted in a system combining OQAM type multicarrier modulations and multiple access techniques carrying out a spreading of the data.

In particular, such a method for receiving comprises a first step for equalizing preceding said step for de-spreading and a second step for equalizing following said step for de-spreading, said second step for equalizing reducing an inter-symbol interference term affecting said estimated data symbols.

This second step for equalizing is particularly valuable when the number of spreading codes implemented makes it possible to surpass the theoretical spectral efficiency of MC-CDMA type prior-art systems.

This spectral efficiency is especially attained when the step for spreading uses the spreading codes of one subset plus at least one spreading code of another subset.

According to one particular characteristic of an embodiment of the invention, the method for receiving comprises an Alamouti type space-time decoding step and is implemented in a multiple-antenna system comprising at least two transmit antennas and at least one receive antenna.

Another aspect of the invention also pertains to a computer program product downloadable from a communications network and/or recorded on a computer-readable carrier and/or executable by a processor, comprising program code instructions for implementing the method for receiving described here above.

In another embodiment, the invention pertains to a device for receiving a multicarrier spread-spectrum signal formed by a temporal succession of multicarrier symbols, implementing an OQAM type modulation and a plurality of mutually orthogonal spreading codes.

The multicarrier spread-spectrum signal having undergone, at transmission, a spreading at least one complex-value data symbol, representing a source data signal to be transmitted, over a set of sub-carriers of at least one multicarrier symbol, each of said sub-carriers modulating a complex value, such a device for receiving comprises means for de-spreading said multicarrier symbols, corresponding to an operation that is the reverse of said spreading, delivering at least one estimated complex value data symbol, representing a source data signal.

Such a receiving device is suited especially to implementing the above described method for receiving. The device may for example be a radiotelephone type terminal, laptop or PDA type personal digital assistant.

BRIEF DESCRIPTION OF THE DRAWINGS

Other features and advantages shall appear more clearly from the following description of a particular embodiment, given by way of a simple illustratory and non-restrictive example and from the appended drawings, of which.

DETAILED DESCRIPTION OF ILLUSTRATIVE EMBODIMENTS

1. General Principle

The general principle of an embodiment of the invention relies on the transmission of complex-value data in a system for transmitting combining a technique of access by code division and OQAM type multicarrier modulation.

An embodiment of the invention therefore proposes a technique for transmitting which enables the transmission of complex-value data and a technique for receiving which enables the precise estimation of these pieces of complex-value data.

Figure 1:
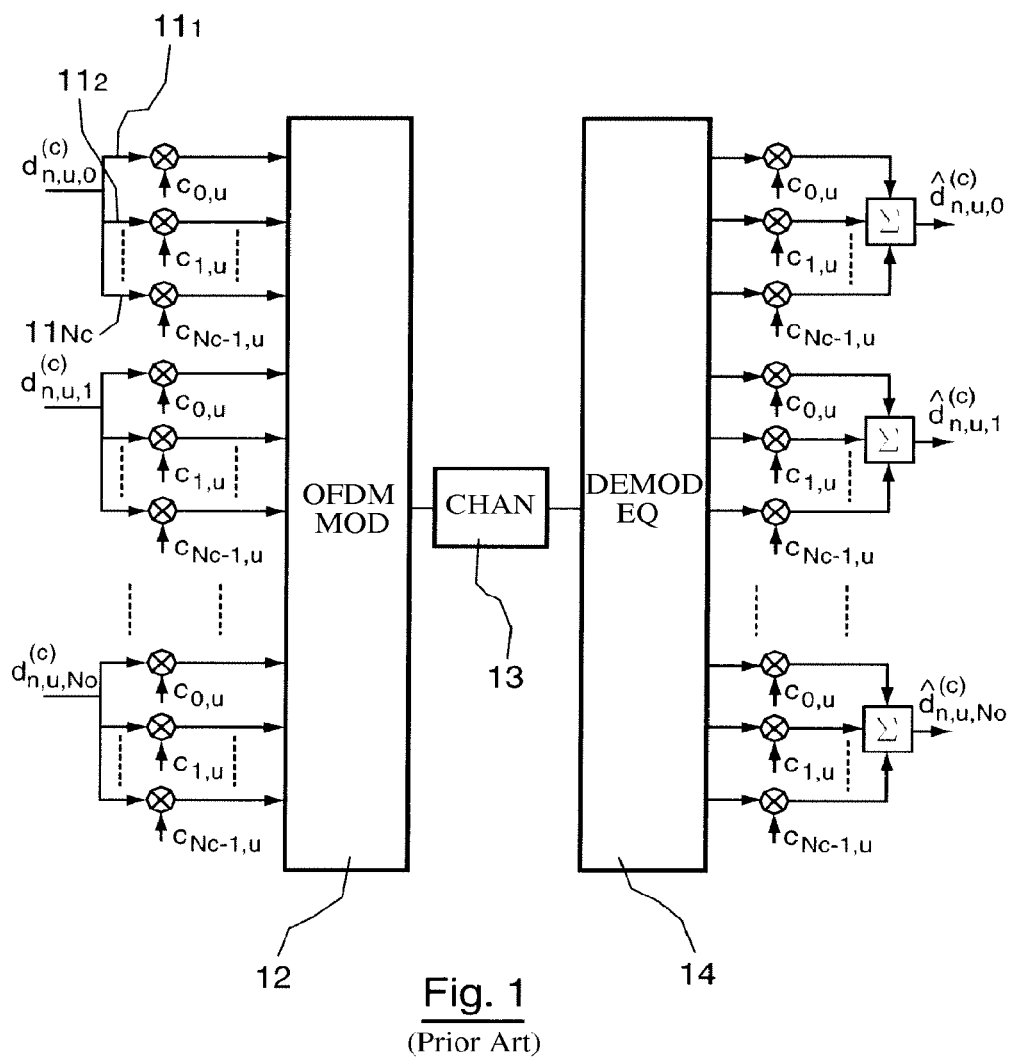
FIG. 1 presents an MC-CDMA type transmission system according to the prior art.
Figure 2:
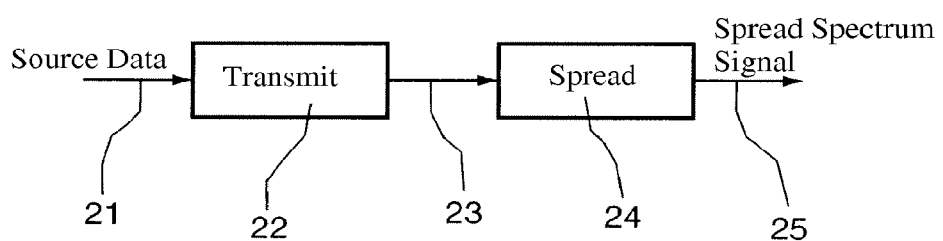
FIG. 2 illustrates the main steps of the method for transmitting according to an embodiment of the invention.

FIG. 2 illustrates the main steps for transmitting a spread-spectrum multicarrier signal according to an embodiment of the invention.

On the transmitting side, a source data signal 21 to be transmitted is represented (22) in the form of at least one complex-value data symbol 23. The method for transmitting according to an embodiment of the invention comprises a step 24 for spreading one or more complex-value data symbols 23 on a set of sub-carriers of at least one multicarrier symbol, each sub-carrier modulating a complex value, delivering a multicarrier spread-spectrum signal 25 formed by a temporal succession of multicarrier symbols.

On the receiving side, the reception method according to an embodiment of the invention comprises a step for de-spreading multicarrier symbols corresponding to a operation in reverse to the spreading operation, delivering one or more estimated complex-value data symbols, representing a source data signal 21.

It may be recalled that the term OQAM modulation is understood to mean both OFDM/OQAM type modulations and BFDM/OQAM type modulations.

2. Description of a Particular Embodiment

More specifically, one particular embodiment relies on a selection of spreading codes to be used when transmitting in order to limit the interference between the data symbols in transmission and in reception.

If we consider a set of N spreading codes available in the communications network (this number of available codes being determined as a function of the sizing of the network), the invention in this embodiment proposes to use only certain codes of these available codes.

For example, if we situate the description in the context of a downlink transmission between a base station and a radio communications terminal, the base station can determine a subset of spreading codes from among the set of available codes, and multiply a complex-value data symbol by a spreading code from the subset.

In the context of an uplink transmission between a radio communications terminal and a base station, the base station can also determine a subset of spreading codes from among the set of available codes and forward this subset of codes, or a piece of information representing this subset, to the terminal. The terminal can then multiply a complex-value data symbol by a spreading code from the subset.

It may be recalled indeed that spreading codes can be associated with distinct users and/or distinct services available in the network. Several spreading codes can also be associated with a same user or a same service.

The proposed solution therefore increases the capacity of the system for transmitting by transmitting complex-value data, whereas it may be recalled that those skilled in the art deem it to be not possible to transmit complex-value data symbols in OQAM mode, especially because of inter-symbol interference generated in transmission and reception.

Moreover, the approach proposed according to an embodiment of the invention does not call for the use of an iterative method when receiving.

Figure 3:
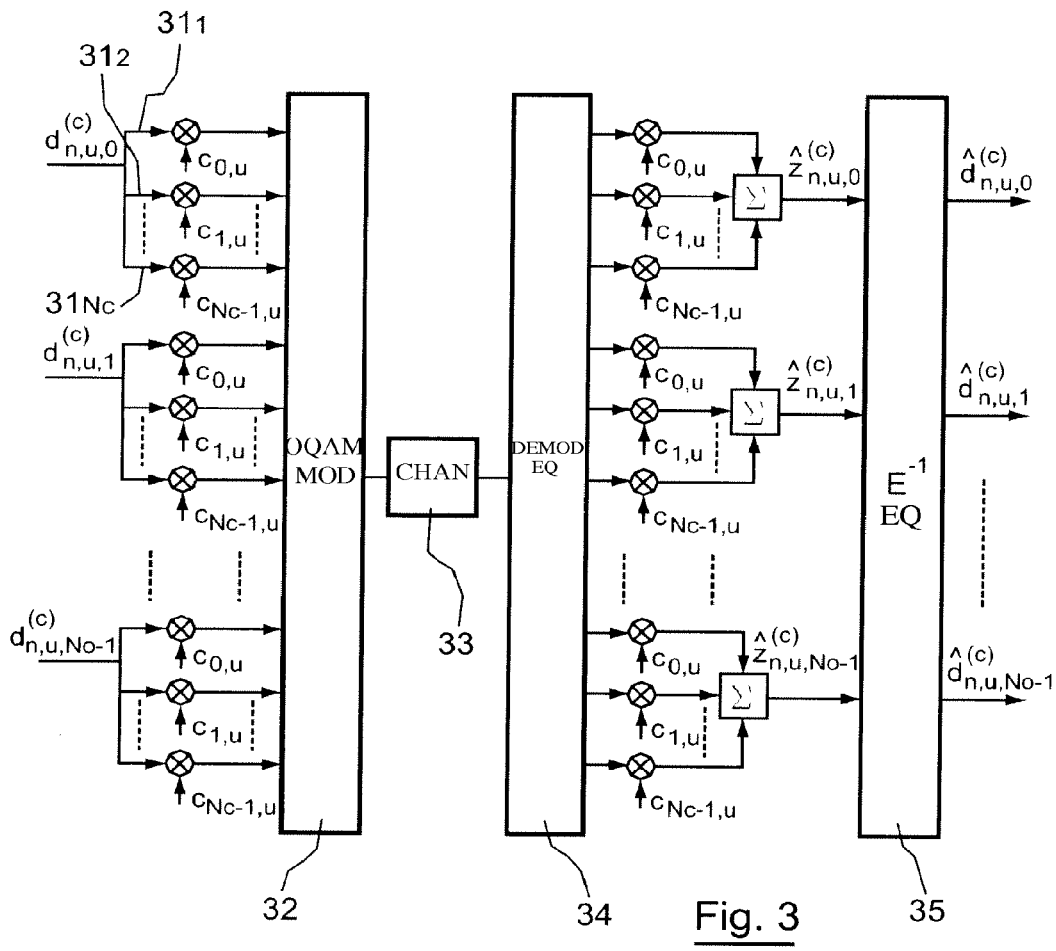
FIG. 3 presents a complex-value OQAM-CDMA type system for transmitting according to an embodiment of the invention.

Referring to FIG. 3, a more precise description is given of the general structure of an OQAM-CDMA system for transmitting according to an embodiment of the invention for a user u.

More specifically, the following notations are used:

U the number of users transmitting information;

$d_{n,u,r}^{(c)}$ the complex data to be transmitted by the user u at the instant $n\tau_0$ on a group of $N_c$ sub-carriers indexed r, with $N_c$ the length of the spreading codes and $\tau_0$ the useful duration of an OQAM multicarrier symbol;

$c_{p,u}$ the code assigned to a user u on the carrier indexed p, where $p=\{0, \ldots, N_c-1\}$;

L the length of the prototype function or functions used; and

Q the size of the frame.

As illustrated with reference to FIG. 3, each complex-value data symbol $d_{n,u,0}^{(c)}$, $d_{n,u,1}^{(c)}$, ..., $d_{n,u,N_0-1}^{(c)}$ undergoes $N_c$ replicas.

If we consider for example the data symbol $d_{n,u,0}^{(c)}$, each replica $31_1, 31_2, \ldots, 31_{Nc}$ of the data symbol has a chip of the spreading code, proper to each user and/or to each service, applied to it.

For example the chip $c_{0,u}$ of the spreading code associated with the user u is applied to the first replica $31_1$ of the data symbol $d_{n,u,0}^{(c)}$, the chip $c_{1,u}$ is applied to the second replica $31_2$ of the data symbol $d_{n,u,0}^{(c)}$, and the chip $c_{N_c-1,u}$ is applied to the last replica $31_{Nc}$ of the data symbol $d_{n,u,0}^{(c)}$.

The complex-value data symbols are therefore multiplied by spreading codes that depend on the sub-carrier considered.

In particular, the spreading codes are chosen from a subset of codes considered in a set of available codes in the communications network. These codes are chosen especially so as to limit the interference affecting the data symbols in reception.

The symbols coming from the spreading operation then undergo an OQAM type multicarrier modulation 32.

Then, the OQAM-CDMA signal is conveyed in the propagation channel 33.

The general principle of transmission therefore relies on implementing an OQAM-CDMA system transmitting complex-value symbols with an appropriate choice of codes.

On the reception side, the received symbol is demodulated and equalized (or equalized and demodulated) according to a ZF (zero forcing) or MMSE (minimum means squared error) type equalizing technique during a first equalizing step 34.

The multicarrier symbols are then de-spread in multiplying the sub-carriers by the corresponding codes and adding up the results, generating estimated complex-value data symbols having inter-symbol interference.

Finally, a second equalizing step 35 is implemented, for example in the form of an interference-eliminating matrix $E^{-1}$ to reduce the interference affecting the estimated complex values data symbols. This matrix $E^{-1}$ corresponds to the reverse of a matrix E representing interferences, also known as an interference matrix. In particular, the expression of the interference-elimination matrix $E^{-1}$ depends on the number of spreading codes used by the system.

More specifically, this second equalizing step limits multiple access interference.

3. Obtaining a Subset of Spreading Codes

Classically, the set of spreading codes available within a network is defined by the columns of a spreading matrix. For example, the spreading matrix is a Walsh-Hadamard type matrix. The spreading codes therefore come from a Walsh-Hadamard matrix or matrices derived from the Walsh-Hadamard matrices defining for example the Golay codes.

According to an embodiment of the invention, at least one subset of spreading codes from this set of available spreading codes is determined.

For example, the obtaining step delivers two subsets of spreading codes determined recursively. The spreading codes of a subset are chosen so as to achieve full control over interference in reception. In other words, the choice of these codes provides for a complex orthogonality of the sub-carriers.

More specifically, the subsets of spreading codes are defined as follows:

for a spreading matrix sized $M=2^{n_0}=2^1$, the first subset $S_1^1$ comprises the spreading code corresponding to the first column of the spreading matrix, and the second subset $S_2^1$ comprises the spreading code corresponding to the second column of the spreading matrix;

for a spreading code sized $M=2^{n_0+1}$, the first subset $S_1^{n_0+1}$ comprises the spreading codes corresponding to the columns of said spreading matrix defined by the indices j such that $j=\{S_1^{n_0} \cup \overline{S}_1^{n_0}\}$, and the second subset $S_2^{n_0+1}$ comprises the spreading code corresponding to the column of said spreading matrix defined by the indices j such that $j=\{S_2^{n_0} \cup \overline{S}_2^{n_0}\}$, for $1 \leq j \leq 2^{n_0+1}$, where:

in letting $i_{1,\alpha}$, for $1 \leq \alpha \leq 2^{n_0-1}$, denote the indices of the codes of the subset $S_1^{n_0}$, and in letting $i_{2,\beta}$, for $1 \leq \beta \leq 2^{n_0-1}$, denote the indices of the codes of the subset $S_2^{n_0}$, such that $$S_1^{n_0} = \{i_{1,1}, i_{1,2}, i_{1,3}, \ldots, i_{1,2^{n_0-1}}\} \text{ and } S_2^{n_0} = \{i_{2,1}, i_{2,2}, i_{2,3}, \ldots, i_{2,2^{n_0-1}}\},$$

we have:

$$S_1^{-n_0} = \{i_{2,1} + 2^{n_0}, i_{2,2} + 2^{n_0}, i_{2,3} + 2^{n_0}, \ldots, i_{2,2^{n_0-1}} + 2^{n_0}\}$$
$$S_2^{-n_0} = \{i_{1,1} + 2^{n_0}, i_{1,2} + 2^{n_0}, i_{1,3} + 2^{n_0}, \ldots, i_{1,2^{n_0-1}} + 2^{n_0}\}.$$

Here below, we present an example of the determining of the subsets of spreading codes for different Walsh-Hadamard matrix sizes.

We consider for example a Walsh-Hadamard matrix sized $N_c=2^{n_0}=2^1$:

$$WH^1 = \begin{pmatrix} 1 & 1 \\ 1 & -1 \end{pmatrix}.$$

The set of available codes is formed by the first column of the matrix, defining a code assigned for example to a first user and a second column of the matrix defining another code assigned for example to a second user.

According to an embodiment of the invention, a subset is chosen from this set of codes.

The first subset therefore corresponds to the first column of the matrix indexed 1, i.e.

$$S_1^1 = \begin{pmatrix} 1 \\ 1 \end{pmatrix},$$

and the second subset to the second column of the matrix indexed 2, i.e.

$$S_2^1 = \begin{pmatrix} 1 \\ -1 \end{pmatrix}.$$

For a Walsh-Hadamard matrix sized $N_c=2^{n_0+1}=2^2=4$, we have:

$$WH^2 = \begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

We therefore determine the first and second subsets as follows, in letting j denote the index of the column of the spreading matrix:
for the first subset $S_1^2$, $j=S_1^1 \cup \overline{S}_1^1 = \{1\} \cup \{2+2^1\} = \{1,4\}$, which means that $S_1^2$ comprises the spreading codes $$\begin{pmatrix} 1 \\ 1 \\ 1 \\ 1 \end{pmatrix} \text{ and } \begin{pmatrix} 1 \\ -1 \\ -1 \\ 1 \end{pmatrix};$$

for the second subset $S_2^2$, $j=S_2^1 \cup \overline{S}_2^1 = \{2\} \cup \{1+2^1\} = \{2,3\}$, which means that $S_2^2$ comprises the spreading codes $$\begin{pmatrix} 1 \\ -1 \\ 1 \\ -1 \end{pmatrix} \text{ and } \begin{pmatrix} 1 \\ 1 \\ -1 \\ -1 \end{pmatrix}.$$

And then, for a Walsh-Hadamard matrix sized $N_c=2^{n_0+1}=2^3=8$, we have:
for the first subset $S_1^3$, $j=S_1^2 \cup \overline{S}_1^2 = \{1,4\} \cup \{2+2^2, 3+2^2\}$, that is $j=\{1,4,6,7\}$,
for the second subset $S_2^3$, $j=S_2^2 \cup \overline{S}_2^2 = \{2,3\} \cup \{1+2^2, 4+2^2\}$ that is $j=\{2,3,5,8\}$;
and so on and so forth.

Thus, according to an embodiment of the invention, rather than use the eight codes associated with the eight columns of the Walsh-Hadamard matrix sized 8, a subset of spreading codes is selected, for example the subset $S_1^3$, and the codes of this subset are used during the spreading step in transmission.

Thus, an embodiment of the invention uses half as many spreading codes as an MC-CDMA system for example, for an identical bit rate sought, thus reducing multiple access interference.

Furthermore, if more than half of the available spreading codes are used, i.e. for example all the spreading codes of the subset $S_1^3$ and a spreading code of the subset $S_2^3$, it is possible to increase the transmission bit rate, i.e. the capacity of the system as compared with the techniques of the prior art.

Finally owing to the transmission of complex-value data and no longer real data in OQAM/CDMA mode, it can be noted that an embodiment of the invention can function in MIMO or MISO mode with an Alamouti type space-time encoding in transmission and an Alamouti type space-time decoding in reception.

4. Reduction of Multiple Access Interference

In order to facilitate an understanding of an embodiment of the invention, here below a number of assumptions are introduced in order to describe the proposed method of resolution. Those skilled in the art will easily extend the teaching described to the general case.

We consider first of all a perfect channel. Thus, with an appropriate sizing of the system, a perfect equalization by carrier is equivalent to having no transmission channel. Initially, the impact of the noise too is overlooked.

The description of an embodiment of the invention is also situated in the context of maximum diversity, which means that the number of modulated sub-carriers is equal to the size of the spreading code.

Consequently, the following notations are used henceforth:
$d_{n,u}^{(c)}$ the complex-value data symbol to be transmitted by the user u;
$c_{m,u}$ the code assigned to a user u on the sub-carrier indexed m;
$a_{m,n,u} = c_{m,u} d_{n,u}^{(c)}$ the complex multicarrier symbol at the instant $n\tau_0$ on the carrier m.

It is also assumed that:
the spreading codes are mutually orthogonal;
the modulation and demodulation base is orthogonal (it being known that an extension to the bi-orthogonal case is possible);
the prototype function g is real;
the length of the prototype filter is a multiple of M, such that L=bM=2bN.

Thus, the multicarrier symbols are transmitted in frames of a length Q by a multicarrier spread-spectrum signal s(t), written as follows in baseband:

$$s(t) = \sum_{n=0}^{Q-1} \sum_{m=0}^{2N-1} x_{m,n} g_{m,n}(t) \qquad (5)$$

with $x_{m,n} = \sum_{u=0}^{U-1} a_{m,n,u}$.

Since the channel is assumed to be perfect, it is deemed to be the case that the received signal on the reception side is also the signal s(t).

Here below, a description is given of the way in which the receiver can retrieve the data $d_{n,u}^{(c)}$ transmitted from s(t).

To this end, we first of all calculate the expression of the complex signal received by a given user $u_0$ after de-spreading by its own code, giving:

$$z_{n_0,u_0}^{(c)} = \sum_{p=0}^{2N-1} c_{p,u_0} \langle y(t), g_{p,n_0}(t) \rangle$$

$$= \sum_{p=0}^{2N-1} c_{p,u_0} \sum_{n=o}^{Q-1} \sum_{m=0}^{2N-1} x_{m,n} \langle g_{m,n}(t), g_{p,n_0}(t) \rangle_c$$

where $\langle .,. \rangle_c$ designates the usual scalar product in complex form.

Since the base of functions $g_{m,n}$ is assumed to be orthogonal in the body of real values, we have:

$$\langle g_{m,n}(t), g_{p,n_0}(t) \rangle_{n_0 + j \gamma_{m,n}^{(p,n_0)} I_{|n-n_0|<2b}} = e^{j\delta_{m-p,n-}} \qquad (6)$$

where $I_{|n-n_0|<2b}$ is the function indicating the interval with a width 2b about $n_0$ and $\gamma_{m,n}^{p,n_0}$ is a real term which can be calculated from the ambiguity function of g(t). The property of real orthogonality therefore enables the signal z to be re-written as follows:

$$z_{n_0,u_0}^{(c)} = \sum_{p=0}^{2N-1} c_{p,u_0} \sum_{n=0}^{Q} \sum_{m=0}^{2N-1} x_{m,n}\left(\delta_{m-p,n-n_0} + j\gamma_{m,n}^{(p,n_0)}\delta_{|n-n_0|<2b}\right) \quad (7)$$

$$= \sum_{p=0}^{2N-1} c_{p,u_0} \left(\sum_{n=-2b+1}^{2b-1} \sum_{m=0}^{2N-1}\right. \quad (8)$$

$$\left.\left(\sum_{u=0}^{U-1} c_{m,u} d_{n+n_0,u}^{(c)}\left(\delta_{m-p,n-n_0} + j\gamma_{m,n+n_0}^{(p,n_0)}\right)\right)\right]$$

$$= \sum_{p=0}^{2N-1} c_{p,u_0} \sum_{u=0}^{U-1} c_{p,u} d_{u_0,u}^{(c)} + \quad (9)$$

$$j\left(\sum_{p=0}^{2N-1}\sum_{\substack{n=-2b+1\\n\neq 0}}^{2b-1}\sum_{m=0}^{2N-1}\sum_{u=0}^{U-1} c_{p,u_0} c_{m,u} d_{n+n_0,u}^{(c)} \gamma_{m,n+n_0}^{(p,n_0)}\right)$$

$$= \sum_{u=0}^{U-1} d_{n_0,u}^{(c)}\left(\sum_{p=0}^{2N-1} c_{p,u_0} c_{p,u}\right) + \quad (10)$$

$$j\left(\sum_{u=0}^{U-1}\sum_{\substack{n=-2b+1\\n\neq 0}}^{2b-1} d_{n+n_0,u}^{(c)}\left(\sum_{p=0}^{2N-1}\sum_{m=0}^{2N-1} c_{p,u_0} c_{m,u} \gamma_{m,n+n_0}^{(p,n_0)}\right)\right)$$

Since the spreading codes are orthogonal, we get:

$$\sum_{p=0}^{2N-1} c_{p,n_0} c_{p,u} = \begin{pmatrix} 1 & si\ u = u_0 \\ 0 & si\ u \neq u_0 \end{pmatrix}$$

making it possible to simplify the equation (10):

$$z_{n_0,u_0}^{(c)} = d_{n_0,u_0}^{(c)} + j\left(\sum_{u=0}^{U-1}\sum_{\substack{n=-2b+1\\n\neq 0}}^{2b-1} d_{n+n_0,u}^{(c)}\left(\sum_{p=0}^{2N-1}\sum_{m=0}^{2N-1} c_{p,n_0} c_{m,u} \gamma_{m,n+n_0}^{(p,n_0)}\right)\right) \quad (11)$$

To express the signals received by the set of U users during the transmission of a frame with a length Q, the vectors X and Z, corresponding respectively to the set of data transmitted and to the information received after de-spreading, are introduced:

$$X = [d_{0,u_0}^{(c)}, d_{1,u_0}^{(c)}, \ldots, d_{Q-1,u_0}^{(c)}, d_{0,u_1}^{(c)}, d(c)_{1,u_1}, \ldots,$$
$$d_{Q-1,u_1}^{(c)}, \ldots, d_{0,u_{v-1}}^{(c)}, d_{1,u_{v-1}}^{(c)}, \ldots,$$
$$d_{Q-1,u_{v-1}}^{(c)}]^t$$

$$Z = [z_{0,u_0}^{(c)}, z_{1,u_0}^{(c)}, \ldots, z_{Q,u_0}^{(c)}, z_{0,u_1}^{(c)}, z_{1,u_1}^{(c)}, \ldots,$$
$$z_{Q,u_1}^{(c)}, \ldots, z_{0,u_{v-1}}^{(c)}, z_{1,u_{v-1}}^{(c)}, \ldots, z_{Q,u_{v-1}}^{(c)}]^t$$

where $^t$ indicates the transposition operation.

In vector form, the demodulation and de-spreading operation can therefore be written as follows:

$$Z = EX \quad (12)$$

where E is the matrix representing interferences affecting the multicarrier spread-spectrum signal, also called an interference matrix.

The elements of the matrix E depend solely on the prototype function and the spreading codes used. Its dimension is Q×U.

Generally, the equation (12) is used to extract the transmitted data either by inversion of the matrix E or by algorithms of lower complexity (based for example on a ZF or MMSE type criterion) that depend on the load of the systems (the number of codes used for example).

If we consider spread nodes derived from a Walsh-Hadamard matrix and a choice of phase of OQAM modulations such that $$\phi_{m,n} = \frac{\pi}{2}(m + n + 2mn),$$

it can be verified that:
  for U=1, the matrix E is the identity matrix as demonstrated in the appendix A. In this case we have $z_{n,u_0}^{(c)} = d_{n,u_0}^{(c)}$, which means that the pieces of data for each user are directly obtained after de-spreading;
  for $$U \leq \frac{M}{2}$$

and an appropriate choice of the U spreading codes (one spreading code being associated with each user), E is the identity matrix as demonstrated in appendix B. In this case, we also have $z_{n,u_0}^{(c)} = d_{n,u_0}^{(c)}$. In addition, we obtain a reduction of the multiple access interference (MAI);
  for $$U > \frac{M}{2},$$

the addition of an additional code takes the form of a non-reversible matrix E. In this case, two solutions are recommended:
  should the different possible sequences of transmitted data elements X give, through multiplication by E, disjoint sequences, then the second equalizing step implements a maximum likelihood (ML) type algorithm even if the matrix E is non-reversible;
  it is also possible to modify the interference matrix E to make it reversible, by canceling for example the lowest interference terms. This cancellation of the lowest interference terms does not introduce any excessive deterioration of performance.

It can be noted that, by applying a different processing operation depending on whether the codes interfere or do not interfere with one another, it is possible to reduce the complexity of computation.

Thus, for the $$\frac{M}{2}$$

codes that do not interfere with one another, the transmission can be done at the maximum rate, i.e. a complex-value data symbol is transmitted every $\tau_0$.

For the $$\left(U - \frac{M}{2}\right)$$

other codes, a transmission at a rate of $$\frac{1}{4b-1}$$

can eliminate interference and bring about an estimation by packets of 4b−1 symbols with an interference matrix E sized (4b−1)×U.

Here below, we describe three examples of implementation of an embodiment of the invention.

$$\text{Case } U = \frac{M}{2} \qquad \text{A)}$$

Figure 4:
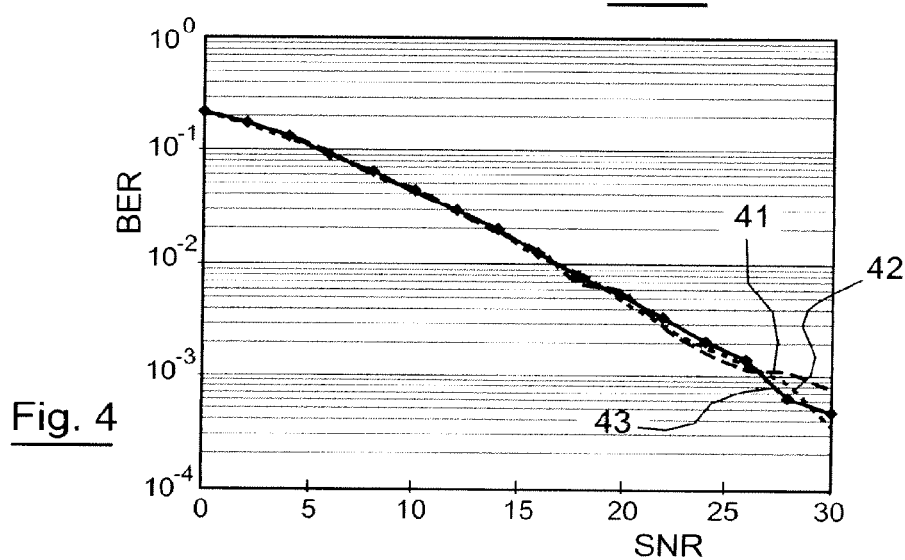
FIGS. 4 to 6 illustrate the performance characteristics of an embodiment of the invention compared with the techniques of the prior art.

First of all, by simulation as illustrated in FIG. 4, data transmission on a Rayleigh channel according to the prior art MC-CDMA technique (curve referenced 42) and real-value OQAM-CDMA technique working under full load with U=M (curve referenced 41), is compared with the complex OQAM-CDMA technique of the an embodiment of invention working at half-load with U=M/2 (curve referenced 43).

It may be recalled that all these techniques give the same spectral efficiency in the absence of a guard interval.

The other characteristics of these systems working with maximum frequency diversity (i.e. $N_c$=M) are:
- a number of sub-carriers M equal to 32;
- a first ZF type equalization;
- in the case of OQAM, the prototype filter used is deduced from the IOTA function with a length 4T0 (b=4);
- in the case of a complex-value OQAM-CDMA, we consider a subset of sixteen codes according to an embodiment of the invention chosen so as not to interfere with one another in following the technique presented here above, which delivers two subsets of codes $S_1^{32}$ and $S_2^{32}$, such that, in letting j denote the index of the column on the spreading matrix:
  - the first subset $S_1^{32}$ is defined by j={1,4,6,7,10,11,13, 16,18,19,21,24,25,28,30,31} and
  - the first subset $S_2^{32}$ is defined by j={2,3,5,8,9,12,14,15, 17,20,22,23,26,27,29,32}.

FIG. 4 shows that, in the case of a first ZF type equalization, the three techniques presented confer the same results in terms of binary error rate (BER) as a function of the signal-to noise ratio or SNR.

Furthermore, compared with the MC-CDMA type techniques, the technique of an embodiment of the invention makes it possible to overcome a guard interval, which gives it greater spectral efficiency.

$$\text{Case } U \leq \frac{M}{2} \qquad \text{B)}$$

Here below, we present the performance of the prior-art techniques and that of the techniques of an embodiment of the invention as a function of the number of spreading codes used, corresponding to a percentage of load of the system.

Figure 5:
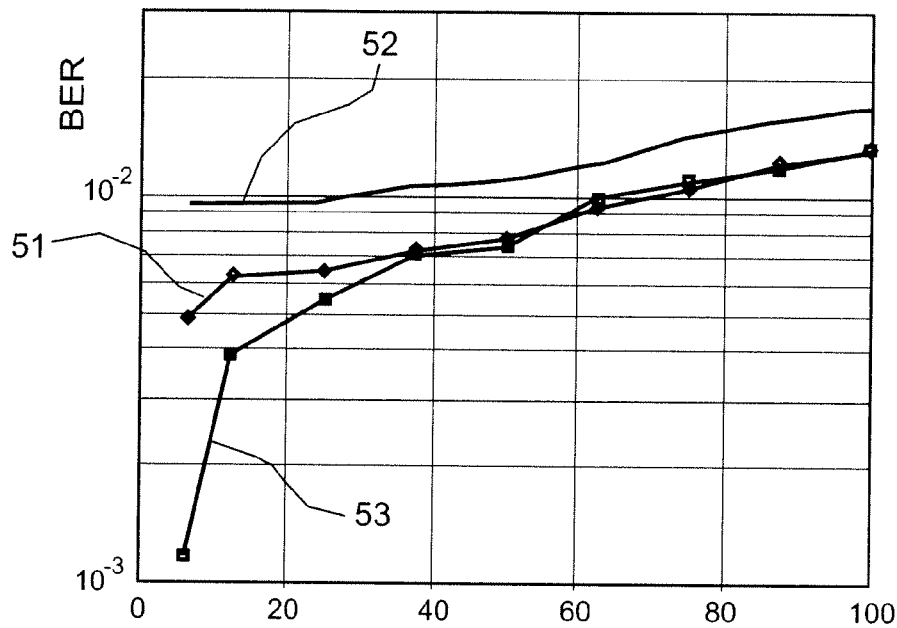

More specifically, FIG. 5 compares the error rate as a function of the percentage of load of the MC-CDMA system (curve referenced 52) and that of the real-value OQAM/CDMA system (curve referenced 51) with the complex-value OQAM/CDMA system of an embodiment of the invention (curve referenced 53) for a value of Eb/N0 that is fixed and is equal to 10 dB.

The profile of the channel for this simulation is the following:
- number of paths: 3;
- time spans (in µs): 0; 0.2527; 0.32;
- power values (in dB): −0; −3; −2.2204;
- carrier frequency: fc=1000 MHz;
- size of the FFT: 32;
- sampling frequency: 10 MHz;
- size of guard interval (in µs): 0.5.

A first MMSE type equalizing technique is used at reception. The interference matrix E is then equivalent to the identity matrix, whatever the load of the system from 1 to 100%, then leading to a similar complexity for all three systems.

FIG. 5 shows that the performance obtained in real-value or complex-value OQAM/CDMA is greater than that obtained in MC-CDMA, whatever the load of the system, as a result of non-insertion of a guard interval.

Furthermore, the OQAM/CDMA system modulating complex data symbols according to an embodiment of the invention gives a gain as compared with the use of real data symbols up to a system load of about 30%.

This gain comes, as stated here above, from the small quantity of multiple access interference (MAI) obtained from the use of a smaller number (for example half the number) of spreading codes during the transmission of complex-value data symbols in OQAM mode. After a 30% load, the performance characteristics of the two real-value and complex-value OQAM systems are almost identical.

$$\text{Case } U > \frac{M}{2} \qquad \text{C)}$$

A context of simulation similar to that of the cases dealt with here above is taken up here again.

Moreover, in the complex-value OQAM-CDMA case according to an embodiment of the invention, an additional code belonging to a second subset is added to the 16 codes of the first subset (it may be recalled that each subset comprises, in this embodiment, half of the available codes in the Walsh-Hadamard matrix that do not interfere with one another).

The set of 17 spread codes is therefore formed by the combination of a first subset, for example $S_2^{32}$, with a code of the second subset, for example the code indexed 1 such that, in letting j denote the index of the column of the spread matrix, the set S is defined by:

j={1,2,3,5,8,9,12,14,15,17,20,22,23,26,27,29,32}

In order to limit the interference prompted by the code indexed 1, we choose the shortest and simplest possible orthogonal prototype filter, i.e. the gate function with b=1, and transmission is done at the rate of 1/3 for the code indexed 1.

We then obtain an interference matrix E such that:

$$E = \begin{pmatrix} I_{3\times 16, 3\times 16} & j*y^t \\ j*y & 1 \end{pmatrix}$$

with y=[0.9801, 0, 0.0199, 0.0852, 0, 0.0852, 0.0247, 0, 0.0247, 0.0247, 0, 0.0247, 0.0277, 0, 0.0277, 0.0277, 0, 0.0277, 0.0181, 0, 0.0181, 0.0374, 0, 0.0374, 0.0293, 0, 0.0293, 0.0293, 0, 0.0293, 0.0183, 0, 0.0183, 0.0404, 0, 0.0403, 0.0194, 0, 0.0194, 0.0503, 0, 0.0503, 0.0238, 0, 0.0238, 0.0238, 0, 0.0238]

It is noted that the matrix E is non-reversible (det(E)=0 for ∥y∥=1).

To make it reversible, it is proposed to cancel the very low values of y (for example values below 0.04), which is equivalent to introducing a value of noise below −34 dB. Hence y is approximated by:

ȳ=[0.9801, 0, 0, 0.0852, 0, 0.0852, 0.0, 0, 0.0247, 0.0, 0, 0.0, 0, 0, 0, 0, 0, 0, 0, 0, 0, 0, 0, 0, 0, 0, 0, 0, 0, 0, 0, 0, 0, 0, 0, 0, 0.0503, 0, 0.0503, 0, 0, 0, 0, 0]

The interference matrix E thus modified becomes reversible. Let $E^{-1}$ denote the inverse of the matrix E.

Figure 6:
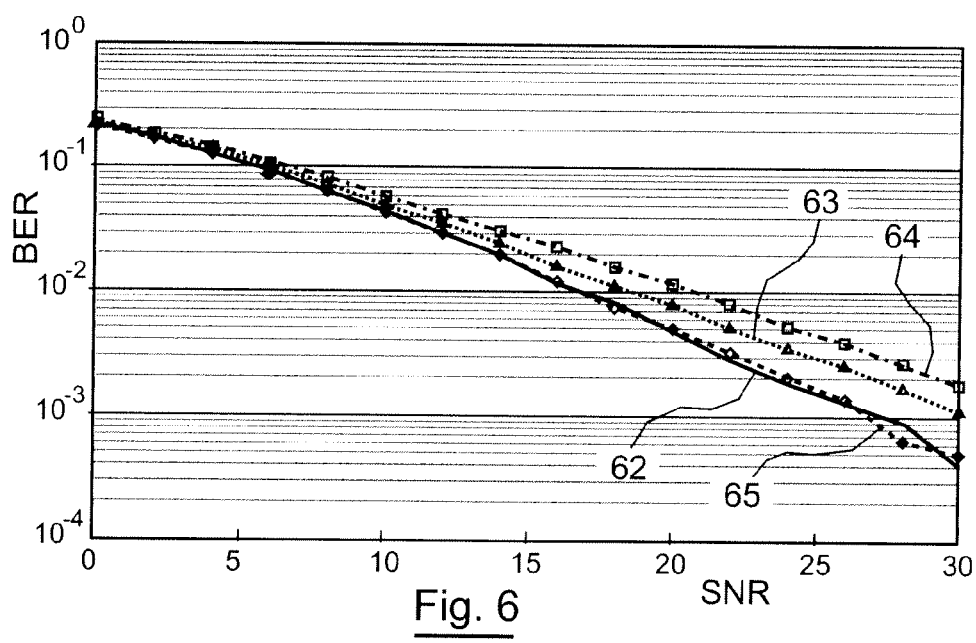

More specifically, FIG. 6 illustrates the performance of a classic MC-CDMA system (curve referenced 62) and the performance of a system according to an embodiment of the invention:
- implementing 16 spread codes (curve referenced 63);
- implementing 17 spread codes and one second equalisation based on the reversal of the modified matrix E and a ZF type technique (curve referenced 64);
- implementing 17 spread codes and a second MV type equalisation on the modified matrix E (curve referenced 65);

It can thus be noted that the addition of an additional code slightly impairs the performance of the complex-value OQAM-CDMA mode according to an embodiment of the invention.

However, this impairment becomes perceptible only for the SNR values beyond 10 dB, i.e. starting from a bit error rate of the order of $5.10^{-2}$. Consequently, the same simulations made with error correction codes produce appreciably equivalent performance values since the activation of the decoding process has taken place, keeping the differences in curves obtained at this point without encoding.

Furthermore, the use of more than half the available spread codes provides for an increase in the capacity of the system.

Thus, one aspect of an embodiment of the invention proposes the use of a specific matrix $E^{-1}$ for eliminating interference at reception, once the number of spread codes implemented makes it possible to surpass the theoretical spectral efficiency of MC-CDMA systems.

It may be recalled that the matrix $E^{-1}$ is used to estimate the information transmitted either by reversal of the matrix E or by algorithms of lower complexity (for example algorithms based on a ZF or MMSE type criterion) depending on the load on the system (the number of codes used for example).

5. Structure of the Transmitting and Receiving Devices

Figure 7:
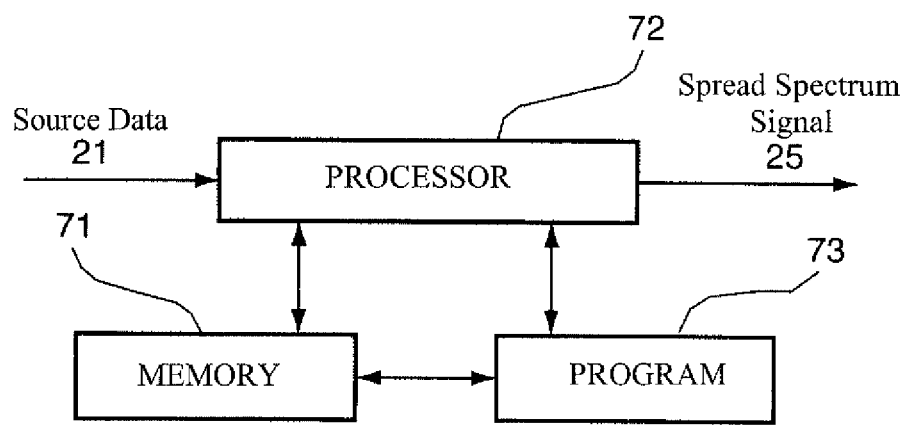
FIGS. 7 and 8 respectively show the simplified structure of a device for transmitting and a device for receiving according to one particular embodiment of the invention.
Figure 8:
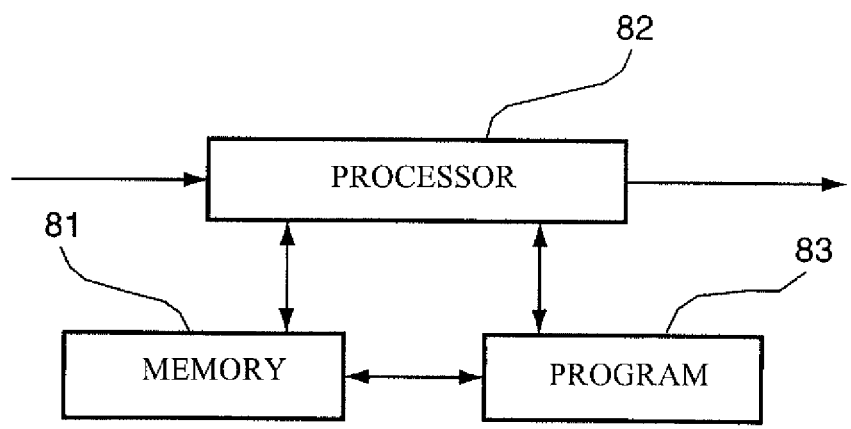

Finally, referring to FIGS. 7 and 8, we present the simplified structure of a transmitting device and a receiving device respectively implementing the transmitting and receiving of complex-value data according to one particular embodiment described here above.

A transmitting device of this kind comprises a memory 71 constituted by a buffer memory, a processing unit 72 equipped for example with a microprocessor µP and driven by the computer program 73, implementing the method for transmitting according to an embodiment of the invention.

At initialisation, the instructions of the code of the computer program 73 are for example loaded into a RAM and then executed by the processor of the processing unit 72. The processing unit 72 inputs a source data signal to be transmitted 21. The microprocessor of the processor 72 carries out the steps of the method for transmitting described here above according to the instructions of the computer program 73 to generate a multicarrier spread-spectrum signal 25. To this end, the transmitting device comprises, in addition to the buffer memory 71, means for spreading at least one complex-value data symbol, representing the source data signal to be transmitted, over a set of sub-carriers of at least one multicarrier symbol, each of said sub-carriers modulating a complex value. These means are driven by the microprocessor of the processing unit 72.

A corresponding receiving device comprises a memory 81 constituted by a buffer memory, a processing unit 82 equipped for example with a microprocessor µP and driven by the computer program 83 implementing the method for receiving according to an embodiment of the invention.

At initialization, the instructions of the code of the computer program 83 are for example loaded into a RAM and then executed by the processor of the processing unit 82. The processing unit 82 inputs a multicarrier spread-spectrum signal 25, formed by a temporal succession of multicarrier symbols. The microprocessor of the processing unit 82 carries out the steps of the method for receiving described here above according to the instructions of the computer program 83 to estimate at least one complex-value data symbol, representing a source data signal.

To this end, the receiving device comprises, in addition to the buffer memory 81, means for de-spreading the multicarrier symbols, corresponding to an operation that is the reverse of said spreading, delivering at least one estimated complex value data symbol, representing a source data signal. These means are driven by the microprocessor of the processing unit 82.

6. Appendix A

Demonstration of the Identity E=I for U=1

First of all we recall the notation used for the OQAM modulation defined by the equation (1) in considering a phase term $$\phi_{m,n} = \frac{\pi}{2}(m + n + 2mn).$$

Here below, the base functions of the equation (1) are rewritten in the form:

$$g_{m,n}(t) = g(t - n\tau_0)e^{j2\pi F_0 t}v_{m,n} \quad (13)$$

with $v_{m,n} = \exp\left(j\frac{\pi}{2}(m + n + 2mn)\right)$ and $F_0 = v_0$.

In this case, the imaginary interference component which appears in the equation (6) can be written as follows:

$$\gamma_{m,n}^{(p,n_0)} = \Im\{(g_{m,n}(t), g_{p,n_0}(t))_c\} \quad (14)$$

$$= \Im\left\{\int_{-\infty}^{\infty} g(t - n\tau_0)g(t - n_0\tau_0)\exp(2j\pi F_0 mt)\right\}$$

-continued
$$\exp(-2j\pi F_0 pt)v_{m,n}v^*_{p,n_0} dt\}$$
$$= \Im\left\{\int_{-\infty}^{\infty} g(u-(n-n_0)\tau_0)g(u)\exp(2j\pi F_0 u(m-p))\right.$$
$$\left.(-1)^{mn_0}(-1)^{-pn_0}v_{m,n}v^*_{p,n_0} du\right\}$$
$$= \Im\{A_g(n-n_0, m-p)(-1)^{mn_0}(-1)^{-pn_0}v_{m,n}v^*_{p,n_0}\}$$

with $A_g$ being an ambiguity function type of function, such that:

$$A_g(n,m) = \int_{-\infty}^{\infty} g(u-n\tau_0)g(u)\exp(2j\pi F_0 um)du \quad (15)$$

Besides, since $v_{m,n}v^*_{p,n_0} = (j)^{m+n-p-n_0}(-1)^{mn-pn_0}$, the equation (14) becomes:

$$\gamma^{(p,n_0)}_{m,n} = \Im(A_g(n-n_0, m-p)(j)^{m+n-p-n_0}(-1)^{mn+mn_0})$$
$$= \Im(A_g(n-n_0, m-p)(j)^{m+n-p-n_0}(-1)^{m(n+n_0)})$$

As indicated in the equation (11), the expression of the signal received after de-spreading by a user $u_0$ is such that:

$$z^{(c)}_{n_0,u_0} = d^{(c)}_{n_0,u_0} + j\left(\sum_{u=0}^{U-1}\sum_{\substack{n=2b+1\\n\neq 0}}^{2b-1} d^{(c)}_{n+n_0,u_0}\left(\sum_{p=0}^{2N-1}\sum_{m=0}^{2N-1} c_{p,u_0}c_{m,u}\gamma^{(p,n_0)}_{m,n+n_0}\right)\right)$$

When U=1, we obtain:

$$z^{(c)}_{n_0,u_0} = d^{(c)}_{n_0,u_0} + j\left(\sum_{\substack{n=-2b+1\\n\neq 0}}^{2b-1} d^{(c)}_{n+n_0,u_0}\left(\sum_{p=0}^{2N-1}\sum_{m=0}^{2N-1} c_{p,u_0}c_{m,u}\gamma^{(p,n_0)}_{m,n+n_0}\right)\right) \quad (17)$$

$$= d^{(c)}_{n_0,u_0} + j\left(\sum_{\substack{n=-2b+1\\n\neq 0}}^{2b-1} d^{(c)}_{n+n_0,u_0}\left(\sum_{p=0}^{2N-1}\sum_{m=0}^{2N-1} c_{p,u_0}c_{m,u_0}\Im(A_g\right.\right.$$
$$(n,m-p)(j)^{m+n-p}(-1)^{m(n+n_0+n_0)})\bigg)\bigg)$$

$$= d^{(c)}_{n_0,u_0} + j\left(\sum_{\substack{n=-2b+1\\n\neq 0}}^{2b-1} d^{(c)}_{n+n_0,u_0}\left(\sum_{p=0}^{2N-1}\sum_{m=0}^{p-1} c_{p,u_0}c_{m,u_0}\right.\right.$$
$$(\Im(A_g(n,m-p)(j)^{m+n-p}(-1)^{mn} +$$
$$\Im(A_g(n,p-m)(j)^{p+u-m}(-1)^{pn})) +$$
$$\sum_{p=0}^{2N-1} c_{p,u_0}c_{p,u_0}(\Im(A_g(n,0)(j)^p(-1)^{pn}))\bigg)\bigg)$$

It can be shown that the last term of the equation (17) is always null. According to the definition recalled in the equation (11), the spreading codes are such that $$c_{p,u_0}c_{p,u_0} = \frac{1}{2N}.$$

Since the prototype function G is supposed to be real, it can be deduced from the equation (16) that the term $A_g(n,0)$ is also real. Hence the last term of the equation (17) denoted $S_1$, can be written as follows:

$$S_1 = \frac{1}{2N}\sum_{p=0}^{2N-1} A_g(n,0)(-1)^{pn}\Im\{j^n\} \quad (18)$$

Since, when n is an even-parity number we have $\Im\{j^n\}=0$, and, should n be an odd-parity number we have $$\sum_{p=0}^{2N-1}(-1)^{pn} = 0,$$

the result of this is that whatever may be n, $S_1=0$.

Then, the second term of the equation (17), denoted $S_2$ is analysed.

$$S_2 = \sum_{p=0}^{2N-1}\sum_{m=0}^{p-1} c_{p,u_0}c_{m,u_0}[\Im\{A_g(n,m-p)(j)^{m+n-p}(-1)^{mn}\} +$$
$$\Im\{A_g(n,p-m)(j)^{p+n-m}(-1)^{pn}\}]$$

Again, since the prototype function g is supposed to be real, we have $A_g(n,m)=A^*_g(n,-m)$, so much so that the two imaginary parts of $S_2$ can be rewritten as follows:

$$\Im\{A_g(n,m-p)(j)^{m+n-p}(-1)^{mn}\}+\Im\{A_g(n,p-m)(j)^{p+n-m}$$
$$(-1)^{pn}\}=\Im\{A_g(n,m-p)(j)^{m+n-p}(-1)^{mn}+A^*_g(n,m-$$
$$p)(j)^{p+n-m}(-1)^{pn}\} \quad (19)$$

For n as an even-parity value, the imaginary part to be extracted from the equation (19) is that of a sum of two conjugate numbers, and it is therefore necessarily null.

For n as an odd-parity number, it can be rewritten as follows:

$$\Im\{A_g(n,m-p)(j)^{m+n-p}(-1)^{mn}+A^*_g(n,m-p)(j)^{p+n-m}(-1)$$
$$^{pn}\}=(j)^n\Re\{A_g(n,m-p)(j)^{m-p}(-1)^{mn}+$$
$$A^*_g(n,m-p)(j)^{p-m}(-1)^{pn})\}$$

We can then distinguish two cases:
p and m have different parities, then:
$$\Re\{(A_g(n,m-p)(j)^{m-p}(-1)^{mn}+A^*_g(n,m-p)$$
$$(j)^{p-m}(-1)^{pn}\}=0$$

p and m have the same parity, then:
$$\Re\{A_g(n,m-p)(j)^{m-p}(-1)^{mn}+A^*_g(n,m-p)$$
$$(j)^{p-m}(-1)^{pn}\}=2\Re\{A_g(n,m-p)(j)^{m-p}$$
$$(-1)^{mn}\}$$

The content of the equation (17) can therefore be obtained by considering the case where n is an odd-parity value and p and m have the same parity:

$$z^{(c)}_{n_0,u_0} = d^{(c)}_{n_0,u_0} + 2j\left(\sum_{n=-b}^{b-1} d^{(c)}_{n_0+n,u_0}\right. \quad (20)$$

-continued $$\left(\sum_{p=0}^{N-1}\sum_{m=0}^{p-1} c_{2p,u_0} c_{2m,u_0}(j)^{2n+1} \Re \right.$$

$$(A_g(2n+1, 2m-2p))(j)^{2m-2p}(-1)^{2m(2n+1)} +$$

$$\sum_{p=0}^{N-1}\sum_{m=0}^{p-1} c_{2p+1,u_0} c_{2m+1,u_0}(j)^{2n+1} \Re$$

$$(A_g(2n+1, 2m-2p)$$

$$\left.(j)^{2m-2p}(-1)^{(2m+1)(2n+1)})\right)$$

$$= d_{n_0,u_0}^{(c)} + 2j \left( \sum_{n=-b}^{b-1} d_{n_0+n,u_0}^{(c)}(j)^{2n+1} \right.$$

$$\left( \sum_{u=0}^{u=N} \Re(A_g(2n+1, n)) \right.$$

$$\left. \left( \sum_{k=0}^{k=2N-1-2v} c_{k+2v,u_0} c_{k,u_0}(-1)^k \right) \right) \right)$$

Because of a property of the Walsh-Hadamard matrices according to which:

$$\sum_{m=0}^{k} c_{k+2v,u_0} c_{k,u_0}(-1)^k = 0, \qquad (21)$$

$$\text{pour } v = 0, \dots, N; k = 0, \dots, 2N-1-2v,$$

the relationship (20) becomes:

$$z_{n_0,u_0}^{(c)} = d_{n_0,u_0}^{(c)}$$

This therefore shows that, with an OQAM-CDMA type system of maximum frequency diversity, i.e. $a_{m,n} = c_m d_m$, and in the case of a single user, it is possible to achieve a transmission of complex-value data $d_m$ without introducing any additional complexity.

7. Appendix B
Demonstration of the Identity E=I for $$U \leq \frac{M}{2}$$

If we consider a Walsh-Hadamard matrix sized $M=2^n$, there are two subsets of indices denoted $S_1^n$ and $S_2^n$, with a cardinal value equal to M/2 and forming a partition of the set of indices.

It is shown first of all that for U=2, with two codes associated respectively with the user $u_0$ and the user $u_1$, such that $u_0, u_1 \in S_1^n$, where $u_0, u_1 \in S_2^n$, we have:

$$z_{n,u_0}^{(c)} = d_{n,u_0}^{(c)} \text{ et } z_{n,u_1}^{(c)} = d_{n,u_1}^{(c)}.$$

For any $n_0$, it is known that, according to the equation (11):

$$z_{n_0,u_0}^{(c)} = d_{n_0,u_0}^{(c)} + j \left( \sum_{u=0}^{U-1} \sum_{\substack{n=-2b+1 \\ n \neq 0}}^{2b-1} d_{n+n_0,u}^{(c)} \left( \sum_{p=0}^{2N-1} \sum_{m=0}^{2N-1} c_{p,u_0} c_{m,u} \gamma_{m,n+n_0}^{(p,n_0)} \right) \right)$$

When U=2, we have:

$$z_{n_0,u_0}^{(c)} = d_{n_0,u_0}^{(c)} + j \left( \sum_{\substack{n=-2b+1 \\ n \neq 0}}^{2b-1} d_{n+n_0,u_0}^{(c)} \left( \sum_{p=0}^{2N-1} \sum_{m=0}^{2N-1} c_{p,u_0} c_{m,u_0} \gamma_{m,n+n_0}^{(p,n_0)} \right) \right) + \qquad (22)$$

$$j \left( \sum_{\substack{n=-2b+1 \\ n \neq 0}}^{2b-1} d_{n+n_0,u_1}^{(c)} \left( \sum_{p=0}^{2N-1} \sum_{m=0}^{2N-1} c_{p,u_0} c_{m,u_1} \gamma_{m,n+n_0}^{(p,n_0)} \right) \right)$$

As shown in the Appendix A, we have:

$$j \left( \sum_{\substack{n=-2b+1 \\ n \neq 0}}^{2b-1} d_{n+n_0,u_0}^{(c)} \left( \sum_{p=0}^{2N-1} \sum_{m=0}^{2N-1} c_{p,u_0} c_{m,u_0} \gamma_{m,n+n_0}^{(p,n_0)} \right) \right) = 0 \qquad (23)$$

Consequently:

$$z_{n_0,u_0}^{(c)} = d_{n_0,u_0}^{(c)} + j \left( \sum_{\substack{n=-2b+1 \\ n \neq 0}}^{2b-1} d_{n+n_0,u_1}^{(c)} \left( \sum_{p=0}^{2N-1} \sum_{m=0}^{2N-1} c_{p,u_0} c_{m,u_1} \gamma_{m,n+n_0}^{(p,n_0)} \right) \right) \qquad (24)$$

$$d_{n_0,u_0}^{(c)} + j \left( \sum_{\substack{n=-2b+1 \\ n \neq 0}}^{2b-1} d_{n+n_0,u_1}^{(c)} \left( \sum_{p=0}^{2N-1} \sum_{m=0}^{2N-1} c_{p,u_0} c_{m,u_1} \gamma_{m,n+n_0}^{(p,n_0)} \right) \right)$$

$$= d_{n_0,u_0}^{(c)} + j \left( \sum_{\substack{n=-2b+1 \\ n \neq 0}}^{2b-1} d_{n+n_0,u_1}^{(c)} \left( \sum_{p=0}^{2N-1} \sum_{m=0}^{2N-1} c_{p,u_0} c_{m,u_1} \Im \right. \right.$$

$$(A_g(n, m-p))(j)^{m+n+n_0-p-n_0}(-1)^{m(n+n_0+n_0)}) \Big) \Big]$$

$$= d_{n_0,u_0}^{(c)} + j \left( \sum_{\substack{n=-2b+1 \\ n \neq 0}}^{2b-1} d_{n+n_0,u_1}^{(c)} \left( \sum_{p=0}^{2N-1} \sum_{m=0}^{p-1} \right. \right.$$

$$(c_{p,u_0} c_{m,u_1} \Im (A_g(n, m-p))(j)^{m+n-p}(-1)^{m,n} +$$

$$(c_{p,u_1} c_{m,u_0} \Im (A_g(n, p-m))(j)^{p+n-m}(-1)^{p,n})) +$$

$$\sum_{p=0}^{2N-1} c_{p,u_0} c_{m,u_1} \left( \Im (A_g(n, 0))(j)^n (-1)^{pn} \right) \Big]$$

Now, according to a second property of the Walsh Hadamard matrices, for $u_0, u_1 \in S_1^n$, we have:

$$\Sigma_{p=0}^{2N-1} c_{p,u_0} c_{p,u_1} (\Im (A_g(n,0))(j)^n (-1)^{pn}) = 0$$

whence:

$$z_{n_0,u_0}^{(c)} = \qquad (25)$$

$$d_{n_0,u_0}^{(c)} + j \left( \sum_{\substack{n=-2b+1 \\ n \neq 0}}^{2b-1} d_{n+n_0,u_1}^{(c)} \left( \sum_{p=0}^{2N-1} \sum_{m=0}^{p-1} (c_{p,u_0} c_{m,u_1} \Im (A_g(n, m-p)) \right. \right.$$

$$(j)^{m+n-p}(-1)^{mn} +$$

-continued $$c_{p,u_1} c_{m,u_0} \Im(A_g(n, p-m)(j)^{p+n-m}(-1)^{pn})$$

Furthermore, according to a third property of the Walsh Hadamard matrices, for any value of n and for $u_0, u_1 \in S_1^n$, we have:

$$\left( \sum_{p=0}^{2N-1} \sum_{m=0}^{p-1} (c_{p,u_0} c_{m,u_1} \Im(A_g(n, m-p)(j)^{m+n-p}(-1)^{nu} + \right. \tag{26}$$

$$\left. c_{p,u_1} c_{m,u_0} \Im(A_g(n, p-m)(j)^{p+n-m}(-1)^{pn}) \right) = 0$$

Consequently, $z_{n,u_0}^{(c)} = d_{n,u_0}^{(c)}$ et $z_{n,u_1}^{(c)} = d_{n,u_1}^{(c)}$.

This result being demonstrated, it can be seen that it is easily extended to $$U \leq \frac{M}{2}$$

with indices for the U users chosen, either in the subset $S_1^n$, or in the subset $S_2^n$.

In other words, the interference matrix E is equal to the identity. The building of the subsets $S_1^n$ and $S_2^n$ is done by recurrence as described here above.

Although the present disclosure has been described with reference to one or more examples, workers skilled in the art will recognize that changes may be made in form and detail without departing from the scope of the disclosure and/or the appended claims.

The invention claimed is:

1. A method comprising:
    transmitting, with a transmitting device, a multicarrier spread-spectrum signal formed by a temporal succession of multicarrier symbols, implementing an OQAM type modulation and a plurality of mutually orthogonal spreading codes;
    spreading, with the transmitting device, at least one complex-value data symbol, representing a source data signal to be transmitted, over a set of sub-carriers of at least one multicarrier symbol, each of said sub-carriers modulating a complex-value data symbol; and
    obtaining at least one subset of spreading codes from a set of available spreading codes, wherein said spreading step implements a multiplication of a complex-value data symbol by a spreading code derived from said subset.

2. The method according to claim 1, wherein the method is implemented in a communications network, and said subset of spreading codes is determined in taking account of a number of transmission streams in said network.

3. The method according to claim 1, wherein said set of available spreading codes is defined by columns of a spreading matrix sized $M=2^{n_0}$, with $n_0$ being a positive integer, and said step of obtaining delivers two subsets of spreading codes, each comprising M/2 codes.

4. The method according to claim 3, wherein said spreading matrix is a Walsh-Hadamard type matrix, and said two subsets are determined recursively.

5. The method according to claim 4, wherein said two subsets $S_1^{n_0}$ and $S_2^{n_0}$ are determined as follows:
    for a spreading matrix sized $M=2^{n_0}=2^1$, the first subset $S_1^1$ comprises the spreading code corresponding to the first column of said spreading matrix, and the second subset $S_2^1$ comprises the spreading code corresponding to the second column of said spreading matrix;
    for a spreading matrix sized $M=2^{n_0+1}$, the first subset $S_1^{n_0+1}$ comprises the spreading codes corresponding to the columns of said spreading matrix defined by the indices j such that $j=\{S_1^{n_0} \cup \overline{S}_1^{n_0}\}$, and the second subset $S_2^{n_0+1}$ comprises the spreading code corresponding to the columns of said spreading matrix defined by the indices j such that $j=S_2^{n_0} \cup \overline{S}_2^{n_0}$, for $1 \leq j \leq 2^{n_0+1}$,
    where:
        in letting $i_{1,\alpha}$, for $1 \leq \alpha \leq 2^{n_0-1}$, denote the indices of the codes of the subset $S_1^{n_0}$ and in letting $i_{2,\beta}$, for $1 \leq \beta \leq 2^{n_0-1}$, denote the indices of the codes of the subset $S_2^{n_0}$ such that $$S_1^{n_0} = \{i_{1,1}, i_{1,2}, i_{1,3}, \ldots, i_{1,2^{n_0-1}}\} \text{ and } S_2^{n_0} = \{i_{2,1}, i_{2,2}, i_{2,3}, \ldots, i_{2,2^{n_0-1}}\},$$

we have $$\overline{S}_1^{n_0} = \{i_{2,1} + 2^{n_0}, i_{2,2} + 2^{n_0}, i_{2,3} + 2^{n_0}, \ldots, i_{2,2^{n_0-1}} + 2^{n_0}\}$$

$$\overline{S}_2^{n_0} = \{i_{1,1} + 2^{n_0}, i_{1,2} + 2^{n_0}, i_{1,3} + 2^{n_0}, \ldots, i_{1,2^{n_0-1}} + 2^{n_0}\}.$$

6. The method according to claim 1, wherein said spreading step uses all the spreading codes of one of said subsets plus at least one spreading code of another subset.

7. The method according to claim 1, wherein said multicarrier spread-spectrum signal is of the BFDM/OQAM or OFDM/OQAM type.

8. The method according to claim 1, wherein the method comprises an Alamouti type space-time encoding step and is implemented in a multiple-antenna system comprising at least two transmit antennas and at least one receive antenna.

9. A non-transitory computer program product recorded on a computer-readable carrier and executable by a processor, comprising program code instructions which when executed implement a method comprising:
    transmitting a multicarrier spread-spectrum signal formed by a temporal succession of multicarrier symbols, implementing an OQAM type modulation and a plurality of mutually orthogonal spreading codes;
    spreading at least one complex-value data symbol, representing a source data signal to be transmitted, over a set of sub-carriers of at least one multicarrier symbol, each of said sub-carriers modulating a complex-value data symbol; and
    obtaining at least one subset of spreading codes from a set of available spreading codes, wherein said spreading step implements a multiplication of a complex-value data symbol by a spreading code derived from said subset.

10. A device comprising:
    means for transmitting a multicarrier spread-spectrum signal formed by a temporal succession of multicarrier symbols, implementing an OQAM type modulation and a plurality of mutually orthogonal spreading codes;

means for spreading at least one complex-value data symbol, representing a source data signal to be transmitted, over a set of sub-carriers of at least one multicarrier symbol, each of said sub-carriers modulating a complex value data symbol; and obtaining at least one subset of spreading codes from a set of available spreading codes, wherein said means for spreading implements a multiplication of a complex-value data symbol by a spreading code derived from said subset.

11. A method comprising:

receiving, with a receiving device, a multicarrier spread-spectrum signal formed by a temporal sequence of multicarrier symbols implementing an OQAM type modulation and a plurality of mutually orthogonal spreading codes, wherein said multicarrier spread-spectrum signal having undergone, at transmission, a step of spreading at least one complex-value data symbol, representing a source data signal to be transmitted, over a set of sub-carriers of at least one multicarrier symbol, each of said sub-carriers modulating a complex value data symbol;

de-spreading, with the receiving device, said multicarrier symbols, corresponding to a step that is the reverse of the spreading step, delivering at least one estimated complex value data symbol, representing a source data signal; and a first step of equalizing, preceding said step of de-spreading, and a second step of equalizing, following said step of de-spreading, said second step of equalizing reducing an inter-symbol interference term affecting said estimated complex value data symbols.

12. The method according to claim 11, wherein the method comprises an Alamouti type space-time decoding step and is implemented in a multiple-antenna system comprising at least two transmit antennas and at least one receive antenna.

13. A non-transitory computer program product recorded on a computer-readable carrier and executable by a processor, comprising program code instructions which when executed implement a method comprising:

receiving a multicarrier spread-spectrum signal formed by a temporal sequence of multicarrier symbols implementing an OQAM type modulation and a plurality of mutually orthogonal spreading codes, wherein said multicarrier spread-spectrum signal having undergone, at transmission, a step of spreading at least one complex-value data symbol, representing a source data signal to be transmitted, over a set of sub-carriers of at least one multicarrier symbol, each of said sub-carriers modulating a complex value data symbol;

de-spreading said multicarrier symbols, corresponding to a step that is the reverse of the spreading step, delivering at least one estimated complex value data symbol, representing a source data signal; and a first step of equalizing, preceding said step of de-spreading, and a second step of equalizing, following said step of de-spreading, said second step of equalizing reducing an inter-symbol interference term affecting said estimated complex value data symbols.

14. A device comprising:

means for receiving a multicarrier spread-spectrum signal formed by a temporal succession of multicarrier symbols, implementing an OQAM type modulation and a plurality of mutually orthogonal spreading codes, said multicarrier spread-spectrum signal having undergone, at transmission, a spreading at least one complex-value data symbol, representing a source data signal to be transmitted, over a set of sub-carriers of at least one multicarrier symbol, each of said sub-carriers modulating a complex value data symbol;

means for de-spreading said multicarrier symbols, corresponding to an operation that is the reverse of said spreading, delivering at least one estimated complex value data symbol, representing a source data signal; and means for implementing a first step of equalizing, preceding said step of de-spreading, and a second step of equalizing, following said step of de-spreading, said second step of equalizing reducing an inter-symbol interference term affecting said estimated complex value data symbols.

* * * * *

UNITED STATES PATENT AND TRADEMARK OFFICE
CERTIFICATE OF CORRECTION

PATENT NO. : 8,432,951 B2  Page 1 of 1
APPLICATION NO. : 12/599762
DATED : April 30, 2013
INVENTOR(S) : Lele et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 739 days.

Signed and Sealed this
Eighth Day of September, 2015

Michelle K. Lee
*Director of the United States Patent and Trademark Office*